(12) United States Patent
Kobayashi et al.

(10) Patent No.: US 6,198,561 B1
(45) Date of Patent: Mar. 6, 2001

(54) LIGHT BEAM DEFLECTION APPARATUS

(75) Inventors: Hiroshi Kobayashi; Hiroyuki Horiai; Naoji Kamimura; Susumu Matsui, all of Hachioji (JP)

(73) Assignee: Konica Corporation (JP)

( * ) Notice: Subject to any disclaimer, the term of this patent is extended or adjusted under 35 U.S.C. 154(b) by 0 days.

(21) Appl. No.: 09/322,606

(22) Filed: May 28, 1999

(30) Foreign Application Priority Data

Jun. 2, 1998 (JP) .................................................. 10-152448

(51) Int. Cl.$^7$ ................................................... G02B 26/08

(52) U.S. Cl. .......................... 359/198; 359/200; 359/216

(58) Field of Search ...................... 359/198, 200, 359/216, 850, 855, 871, 872; 310/90, 90.5

(56) References Cited

U.S. PATENT DOCUMENTS 5,420,713 * 5/1995 Kunii ..................................... 359/198

* cited by examiner

Primary Examiner—James Phan
(74) Attorney, Agent, or Firm—Jordan B. Bierman; Bierman, Muserlian and Lucas

(57) ABSTRACT

There is described a light beam deflection apparatus in which the distortion of the polygon mirror is reduced, and the mounting accuracy of the polygon mirror is improved. The light beam deflection apparatus includes a base plate, a coil being stationary relative to the base plate and a mirror unit being rotatable with respect to the base plate. The mirror unit includes a polygon mirror, a rotating disk to mount the polygon mirror, a rotating yoke fixed to the rotating disk, a magnet attached to the rotating yoke and located opposite the coil and a buffer member inserted into a gap between the polygon mirror and the rotating yoke.

14 Claims, 1 Drawing Sheet

LIGHT BEAM DEFLECTION APPARATUS

BACKGROUND OF THE INVENTION

The present invention relates to a light beam deflection apparatus which incorporates a polygon mirror and is employed for, e.g., a laser printer, a bar-code reader, a laser copier, etc.

In the conventional light beam deflection apparatus, the polygon mirror rotates at a high rate, by means of a rotating disk linked to the polygon mirror. The rotating disk includes permanent magnets arranged on it and is driven by driving coils fixed on a base plate. The rotational torque of the polygon mirror is generated by the magnetic forces between the permanent magnets and the driving coils.

In the abovementioned apparatus, however, since the rotating disk, on which the permanent magnets and the polygon mirror are mounted, is joined to a rotatable axis, the reference surface on which the polygon mirror is attached is liable to be distorted when the permanent magnets are mounted on the rotating disk. Owing to this shortcoming, the distortion and/or an inclination of the polygon mirror surface has been relatively high.

To prevent the distortion of the polygon mirror, it is required to employ an adhesive which causes little distortion of the polygon mirror when the permanent magnets are adhered onto the rotating disk. Generally speaking, however, an adhesive causing little distortion is liable to be lower in the reliability of its adhesion, due to the weakness of its adhesive force.

SUMMARY OF THE INVENTION

The present invention is attained in view of the above-described situations, and the object of the present invention is to provide a light beam deflection apparatus in which the distortion of the polygon mirror is reduced at a minimum level by preventing propagation of the distortion caused by the adhesive process of the permanent magnets, and in which the mounting accuracy of the polygon mirror is improved by strengthening the joint to the rotating axis.

To overcome the cited shortcomings, the abovementioned object of the present invention can be attained by a light beam deflection apparatus, comprising:

a base plate;

a coil being stationary relative to the base plate; and a mirror unit being rotatable with respect to the base plate, wherein the mirror unit is comprised of a polygon mirror, a rotating disk to mount the polygon mirror, a rotating yoke fixed to the rotating disk, a magnet attached to the rotating yoke and located opposite the coil and a buffer member inserted into a gap between the polygon mirror and the rotating yoke.

Further, in order to solve the above-described problems and to attain the abovementioned object, the following features of light beam deflection apparatus are desirable embodiments of the present invention.

(1) A light beam deflection apparatus in which, permanent magnets fixed on the rotating yoke are arranged opposite the coil fixed on the base plate to generate torque for rotating the polygon mirror, and the polygon mirror is attached to the rotating disk so that an end surface of the polygon mirror contacts the reference surface of the rotating disk, and a buffer member is inserted between the other end surface of the polygon mirror and the rotating yoke, fixed to the rotating disk, so that the polygon mirror is rotatable with the rotating disk.

Since the polygon mirror is attached to the rotating disk by contacting an end surface of the polygon mirror to the reference surface of the rotating disk and inserting a buffer member between the other end surface of the polygon mirror and the rotating yoke, it is possible to prevent the propagation of the distortion, caused by adhesion of the magnets, not only during the initial period after assembly, but also in the high temperature atmosphere generated during the actual operation. Further, since the magnets are not directly adhered to the rotating disk having the reference surface for attaching the polygon mirror, distortion caused by adhesion of the magnets does not occur in the rotating disk. Therefore, it becomes possible to employ an adhesive having a strong adhesive force and suitable adhesive conditions without considering the distortions caused by adhesion of the magnets.

(2) The light beam deflection apparatus of item (1) in which, the buffer member is an elastic material.

According to the above, the elastic material can surely prevent distortion caused by adhesion of the magnets from transmitting to the polygon mirror.

(3) The light beam deflection apparatus of item (2) in which, the buffer member is either a leaf spring or a rubber.

According to the above, a leaf spring can be surely prevent distortion caused by adhesion of the magnets, from transmitting to the polygon mirror, without being influenced by the high heat generated during actual operation. In case of employing a rubber, the propagation of the distortion would be surely prevented as well, since the rubber would equally absorb the distortion caused by adhesion of the magnets.

(4) The light beam deflection apparatus of item (1) in which, the rotating yoke is fastened to the rotating disk by means of fastening members.

According to the above, it becomes possible to firmly fix the polygon mirror onto the rotating disk in a simple structure using only the fastening members.

(5) The light beam deflection apparatus in which, permanent magnets fixed on the rotating yoke are arranged opposite the coil fixed on the base plate to generate torque for rotating the polygon mirror, and the polygon mirror is attached to the rotating disk so that an end surface of the polygon mirror contacts the reference surface of the rotating disk, and the buffer member is inserted between another end surface of the polygon mirror and the rotating yoke, fixed to the rotating disk, so that the polygon mirror is rotatable with the rotating disk, and the rotating disk is jointed to the rotating axis.

Since the polygon mirror is attached to the rotating disk by contact to the reference surface of the rotating disk which is jointed to the rotating axis and by inserting the buffer member between the polygon mirror and the rotating yoke, it is possible to improve the inclination angle of the polygon mirror.

(6) The light beam deflection apparatus of item (5) in which,

A shrinkage fitting method is employed for joining the rotating disk to the rotating axis.

Since the rotating disk is jointed to the rotating axis by a shrinkage fitting process, it becomes possible to surely improve the accuracy of inclination angle of the polygon mirror.

(7) The light beam deflection apparatus of item (5) in which,
an adhesion method is employed for joining the rotating disk to the rotating axis.

Since the rotating disk is joined to the rotating axis by an adhesion process, it becomes possible to improve the accuracy of the inclination angle of the polygon mirror in a rather simple way.

(8) The light beam deflection apparatus of item (5) in which,
a method of adhesion after the shrinkage fitting is employed for joining the rotating disk to the rotating axis.

Since the rotating disk is joined to the rotating axis by adhesion after the shrinkage fitting process, it becomes possible to surely improve the accuracy of the inclination angle of the polygon mirror.

(9) The light beam deflection apparatus of items (5) through (8) in which,
the reference surface for attaching the polygon mirror is formed by a cutting process.

Since the reference surface for attaching the polygon mirror is formed by a cutting process after the joining process, any distortion of the rotating disk caused by the joining process does not influence the accuracy of the reference surface.

(10) The light beam deflection apparatus in which,
permanent magnets fixed on the rotating yoke are arranged opposite the coil fixed on the base plate to generate torque for rotating the polygon mirror, and
the polygon mirror is attached to the rotating disk so that an end surface of the polygon mirror contacts the reference surface of the rotating disk, and
the buffer member is inserted between the other end surface of the polygon mirror and the rotating yoke, which is fixed to the rotating disk, so that the polygon mirror is rotatable with the rotating disk as a unit, and
the rotating disk comprises a flange section on which the reference surface for attaching the polygon mirror is formed and also a sleeve section to which the rotating axis is joined.

Since the rotating disk comprises a flange section on which the reference surface for attaching the polygon mirror is formed and also a sleeve section to which the rotating axis is joined, and the strength of the joint between the rotating disk and the rotating axis can be improved by the sleeve section which also serves as an attaching reference for the rotational center of the polygon mirror, it is possible to improve the centering accuracy of the polygon mirror.

(11) The light beam deflection apparatus of item (10) in which,
the sleeve section of the rotating disk is joined to the rotating axis.

Since the sleeve section of the rotating disk is joined to the rotating axis, the strength of the joint between the rotating disk and the rotating axis is improved.

(12) The light beam deflection apparatus of item (10) in which,
the rotating yoke is fastened to the rotating disk by means of fastening members.

Since the rotating yoke is fastened to an end surface of the sleeve section of the rotating disk by means of the fastening members, the pressing force of the leaf spring, etc., applied to the polygon mirror, can be stabilized. Therefore, it becomes possible to firmly fix the polygon mirror onto the rotating disk without generating any distortions on it and without influenced by any shocks, in a simple structure using only the fastening members.

BRIEF DESCRIPTION OF THE DRAWINGS

The objects and advantages of the present invention will become more apparent upon further reading the following detailed description and upon reference to the drawings in which.

DETAILED DESCRIPTION OF THE PREFERRED EMBODIMENT

Figure 1:
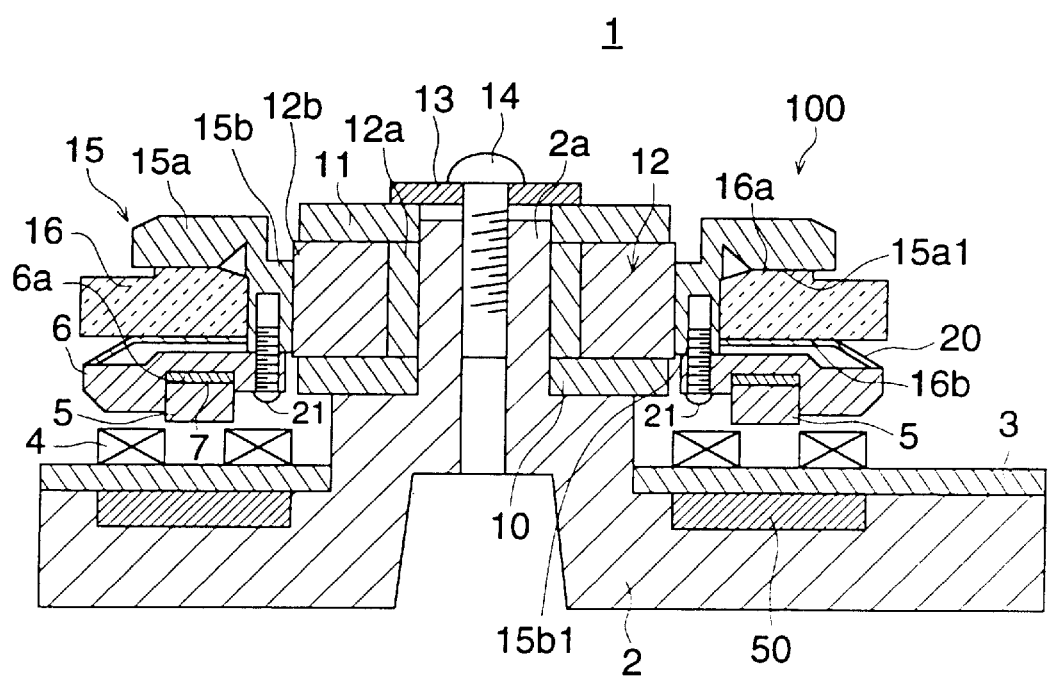
FIG. 1 shows a lateral cross-sectional view of a light beam deflection apparatus.

In the following, an example of a light beam deflection apparatus, embodied in the present invention, will be described, referring the drawing. FIG. 1 shows a cross-sectional view of a light beam deflection apparatus 1. To deflect a laser beam in accordance with the rotation of a polygon mirror 16, the light beam deflection apparatus 1, which is incorporated in a laser printer, a bar-code reader, a laser copier, etc., is fixed on the apparatus main frame.

The polygon mirror 16 is inserted into the rotating disk 15, in such a manner that an end surface 16a of the polygon mirror 16 contacts a reference surface 15a1 of the rotating disk 15, while the other end surface 16b of the polygon mirror 16 is pressed by a buffer member 20 mounted on a rotating yoke 6, so that those can rotate integrally. The rotating yoke 6 is fastened to the rotating disk 15 by means of fastening members 21 such as screws, etc., and the rotating disk 15 is joined to a rotating axis 12. Thus, a mirror unit 100 is assembled as an integral unit.

The mirror unit 100 is inserted into an axial section 2a of the base plate 2, associating with a lower thrust 10 and an upper thrust 11, and is rotatably mounted on the base plate 2 by means of screw 14 inserted through a plate 13.

A stationary yoke 50 and a substrate 3, on which coils 4 are attached, are mounted on the base plate 2. Magnets 5 are adhered to concave holes 6a formed on the disk-shaped rotating yoke 6 with adhesion layers 7. The magnets 5 are arranged opposite the coils 4 so as to generate a torque for rotating the mirror unit 100. Iron, aluminum, etc. can be employed for the material of the rotating yoke 6, and it is also applicable to insert a rotor (not shown) made of iron, etc. between the magnets 5 and the rotating yoke 6.

The rotating axis 12 is comprised of an inner sleeve 12a fastened by the screw 14 and an outer sleeve 12b which rotates on the inner sleeve 12a. The rotating disk 15 is joined to the outer sleeve 12b so that the mirror unit 100 rotates on the rotating axis 12. Incidentally, the bearing structure of the present embodiment is a dynamic pressure bearing composed of the lower thrust 10, the upper thrust 11, the inner sleeve 12a and the outer sleeve 12b. In this structure, it is applicable that grooves, for generating the dynamic pressure, are formed on the lower thrust 10 and/or the outer surface of the inner sleeve 12a. Further, the scope of the applicable bearing, in the present invention, is not limited to the structure shown in the present embodiment. A dynamic air pressure bearing, a dynamic oil pressure bearing, a ball bearing, etc. are applicable as well.

The rotating disk 15 comprises a flange section 15a on which the reference surface 15a1 for attaching the polygon mirror 16 is formed, and also a sleeve section 15b to which the outer sleeve 12b of the rotating axis 12 is joined. It is possible to improve the centering accuracy of the polygon mirror 16, since the strength of the joint between the rotating disk 15 and the rotating axis 12 can be improved by joining the sleeve section 15b to the outer sleeve 12b, and the sleeve section 15b also serves as an attaching reference for the rotational center of the polygon mirror 16.

A shrinkage fitting method is employed for joining the sleeve section 15b to the outer sleeve 12b. Alternatively, either a single adhesion method or a method of adhesion after the shrinkage fitting can be also employed for the same purpose. By applying one of the above methods, the inclination angle accuracy of the polygon mirror 16 can be surely improved.

After joining the sleeve section 15b to the outer sleeve 12b, the reference surface 15a1 for attaching the polygon mirror 16 is formed on the sleeve section 15b by a cutting process. Next, the polygon mirror 16 is inserted into the sleeve section 15b, in such a manner that the end surface 16a of the polygon mirror 16 contacts the reference surface 15a1. As mentioned above, since the reference surface 15a1 is formed by a cutting process after the joining process, any distortion of the rotating disk 15 caused by the joining process does not influence the accuracy of the reference surface 15a1.

A propagation of distortion caused by adhesion of the magnets 5, from the rotating yoke 6 to the other end surface 16b of the polygon mirror 16, can be surely prevented by employing an elastic material such as a leaf spring, a rubber, etc., for the buffer member 20 which is inserted between them. In the present embodiment, a leaf spring is employed for the buffer member 20 to surely prevent the propagation of distortion caused by adhesion of the magnets 5, without being influenced by the high heat generated during actual operation. In case of employing a rubber, the propagation of the distortion would be surely prevented as well, since the rubber would equally well absorb distortion caused by adhesion of the magnets 5.

Further, since the rotating yoke 6 is fastened to an end surface 15b1 of the sleeve section 15b of the rotating disk 15 by means of the fastening members 21 such as screws, etc., the pressing force of the leaf spring, applied to the polygon mirror 16, can be stabilized. Therefore, it becomes possible to firmly fix the polygon mirror 16 onto the rotating disk 15 without generating any distortions and without being influenced by any shocks, by means of a simple structure using only the fastening members 21.

Since the end surface 16a of the polygon mirror 16 contacts the reference surface 15a1 and the buffer member 20 is inserted between the polygon mirror 16 and the rotating yoke 6 to which the magnets 5 are adhered, it is possible to prevent the propagation of distortions caused by adhesion of the magnets 5, not only at the initial period after the assembling, but also in a high temperature atmosphere generated during the actual operations. Further, since the magnets 5 are not directly adhered to the rotating disk 15 having the reference surface 15a1 for attaching the polygon mirror 16, the distortions caused by adhesion of the magnets 5 do not occur in the rotating disk 15. Therefore, it becomes possible to employ a strong adhesive and create suitable adhesive conditions with no need to consider distortions caused by adhesion of the magnets 5.

Furthermore, it is also possible to improve the inclination of the polygon mirror 16, since the polygon mirror 16 is attached to the reference surface 15a1 of the rotating disk 15, jointed to the rotating axis 12, with the buffer member 20 inserted between the polygon mirror 16 and the rotating yoke 6.

As described above, according to the present invention, the following advantages will be attained.

(1) Since the polygon mirror is attached to the rotating disk by contacting an end surface of the polygon mirror to the reference surface of the rotating disk and by inserting the buffer member between the other end surface of the polygon mirror and the rotating yoke, it is possible to prevent the propagation of distortions caused by adhesion of the magnets, not only at the initial period after the assembling, but also in a high temperature atmosphere generated during the actual operations. Further, since the magnets are not directly adhered to the rotating disk having the reference surface for attaching the polygon mirror, distortions caused by adhesion of the magnets do not occur in the rotating disk. Therefore, it becomes possible to employ a strong adhesive and create suitable adhesive conditions with no need to consider distortions caused by adhesion of the magnets.

(2) A propagation of distortions caused by adhesion of the magnets to the polygon mirror can be surely prevented by means of an elastic material.

(3) A propagation of distortions caused by adhesion of the magnets to the polygon mirror can be surely prevented by means of a leaf spring, without being influenced by the high heat generated during actual operations. In case of employing a rubber, the propagation of distortions would be surely prevented as well, since the rubber would equally well absorb any distortions caused by adhesion of the magnets.

(4) It becomes possible to firmly fix the polygon mirror onto the rotating disk in a simple structure using only the fastening members.

(5) Since the polygon mirror is attached to the rotating disk by contacting the reference surface of the rotating disk, which is joined to the rotating axis, and by inserting the buffer member between the polygon mirror and the rotating yoke, it is possible to improve the inclination angle of the polygon mirror.

(6) Since the rotating disk is joined to the rotating axis by a shrinkage fitting process, it becomes possible to surely improve an accuracy of inclination angle of the polygon mirror.

(7) Since the rotating disk is joined to the rotating axis by an adhesion process, it becomes possible to improve an accuracy of inclination angle of the polygon mirror in a simple way.

(8) Since the rotating disk is joined to the rotating axis by an adhesion process after the shrinkage fitting process, it becomes possible to surely improve accuracy of the inclination angle of the polygon mirror.

(9) Since the reference surface for attaching the polygon mirror is formed by a cutting process after the joining process, distortions of the rotating disk caused by the joining process does not influence the accuracy of the reference surface.

(10) Since the rotating disk comprises a flange section on which the reference surface for attaching the polygon mirror is formed and also a sleeve section to which the rotating axis is joined, and the strength of the joint between the rotating disk and the rotating axis can be improved by the sleeve section which also serves as an attaching reference for the rotational center of the polygon mirror, it is possible to improve the centering accuracy of the polygon mirror.

(11) Since the sleeve section of the rotating disk is joined to the rotating axis, the strength of the joint between the rotating disk and the rotating axis is improved.

(12) Since the rotating yoke is fastened to an end surface of the sleeve section of the rotating disk by means of the fastening members, the pressing force of a leaf spring, etc., applied to the polygon mirror, can be stabilized. Therefore, it becomes possible to firmly fix the polygon mirror onto the rotating disk without generating any distortions of it and without being influenced by any shocks, in a simple structure using only the fastening members.

What is claimed is:

1. A light beam deflection apparatus, comprising:
   a base plate;
   a coil being stationary relative to said base plate; and
   a mirror unit being rotatable with respect to said base plate, said mirror unit comprising
      a polygon mirror,
      a rotating disk to mount said polygon mirror,
      a rotating yoke fixed to said rotating disk,
      a magnet attached to said rotating yoke and located opposite said coil and
      a buffer member inserted into a gap between said polygon mirror and said rotating yoke,
      wherein said rotating yoke is fastened to said rotating disk by means of a fastening member.

2. The light beam deflection apparatus of claim 1, wherein said magnet is fixed to said rotating yoke by means of an adhesive.

3. The light beam deflection apparatus of claim 1, wherein said buffer member comprises an elastic material.

4. The light beam deflection apparatus of claim 1, wherein said buffer member comprises a leaf spring or a rubber.

5. The light beam deflection apparatus of claim 1, wherein an end surface of said polygon mirror is positioned with respect to a reference surface of said rotating disk while another end surface of said polygon mirror is contacted with said buffer member.

6. The light beam deflection apparatus of claim 1, wherein said magnet is a permanent magnet.

7. The light beam deflection apparatus of claim 1, wherein said rotating disk is joined to an outer sleeve of a rotating axis.

8. The light beam deflection apparatus of claim 1, wherein a shrinkage fitting process is employed for joining said rotating disk to said outer sleeve.

9. The light beam deflection apparatus of claim 1, wherein an adhesive process is employed for joining said rotating disk to said outer sleeve.

10. The light beam deflection apparatus of claim 1, wherein both a shrinkage fitting process and an adhesive process are employed for joining said rotating disk to said outer sleeve.

11. The light beam deflection apparatus of claim 1, wherein said rotating axis comprises an inner sleeve being stationary relative to said base plate and said outer sleeve being rotatable with respect to said inner sleeve.

12. The light beam deflection apparatus of claim 1, wherein said rotating disk includes a reference surface to position an end surface of said polygon mirror, and said reference surface is formed by a cutting process, after said rotating disk is joined to said outer sleeve.

13. The light beam deflection apparatus of claim 1, wherein said rotating disk comprises a flange section which includes a reference surface to position an end surface of said polygon mirror and a sleeve section to be joined to said outer sleeve.

14. A light beam deflection apparatus comprising:
   a base plate having a rotating axis;
   a coil being stationary relative to said base plate; and
   a mirror unit being rotatable with respect to said base plate, said mirror unit comprising
      a polygon mirror,
      a rotating disk to mount said polygon mirror and joined to an outer sleeve of said rotating axis, wherein said rotating disk comprises a flange section which includes a reference surface to position an end surface of said polygon mirror and a sleeve section to be joined to said outer sleeve,
      a rotating yoke fastened to said rotating disk by means of a fastening member,
      a magnet attached to said rotating yoke and located opposite said coil, and
      a buffer member inserted into a gap between said polygon mirror and said rotating yoke.

* * * * *